United States Patent [19]

Bertin et al.

[11] Patent Number: 5,065,850
[45] Date of Patent: Nov. 19, 1991

[54] ACTUATOR FOR A SERVO CONTROLLED CLUTCH WITH LUBRICATING MECHANISM

[75] Inventors: Patrice Bertin, Mery-sur-Oise; Christian Pankowiak, Saint-Ouen, both of France

[73] Assignee: Valeo, Paris, France

[21] Appl. No.: 506,813

[22] Filed: Apr. 10, 1990

[30] Foreign Application Priority Data

Apr. 13, 1989 [FR] France .................. 89 04889

[51] Int. Cl.[5] .................................. F16D 23/12
[52] U.S. Cl. .................. 192/90; 192/113 R; 74/467
[58] Field of Search ............ 192/90, 113 R; 74/467; 184/26, 32; 417/437

[56] References Cited

U.S. PATENT DOCUMENTS

| | | | |
|---|---|---|---|
| 1,682,348 | 8/1928 | Porter | 192/109 R |
| 2,472,802 | 6/1949 | Bentley | 184/26 X |
| 4,650,056 | 3/1987 | Sevennec et al. | 192/90 |
| 4,828,093 | 5/1989 | Bertin et al. | 192/90 |

FOREIGN PATENT DOCUMENTS

| | | |
|---|---|---|
| 1605942 | 4/1971 | Fed. Rep. of Germany . |
| 2317209 | 10/1974 | Fed. Rep. of Germany . |
| 2564999 | 11/1985 | France . |
| 2610259 | 8/1988 | France . |

*Primary Examiner*—Richard Lorence
*Attorney, Agent, or Firm*—Charles A. Brown

[57] ABSTRACT

An actuator comprising, in a casing, a mechanism which is controlled by a motor and which is adapted to control an output member. The mechanism including in particular a moveable thrust unit which is arranged generally for to and fro movement. The casing is liquid-tight, and incorporates a sump for containing a liquid lubricant. A pump is associated with this sump, the pump being arranged to be actuated by the moveable thrust unit. The suction port is in communication with the lower part or sump of the casing, while its delivery port is in communication with the mechanism in at least one region of the latter that is to be lubricated.

8 Claims, 1 Drawing Sheet

U.S. Patent
Nov. 19, 1991
5,065,850
FIG.1
FIG.2
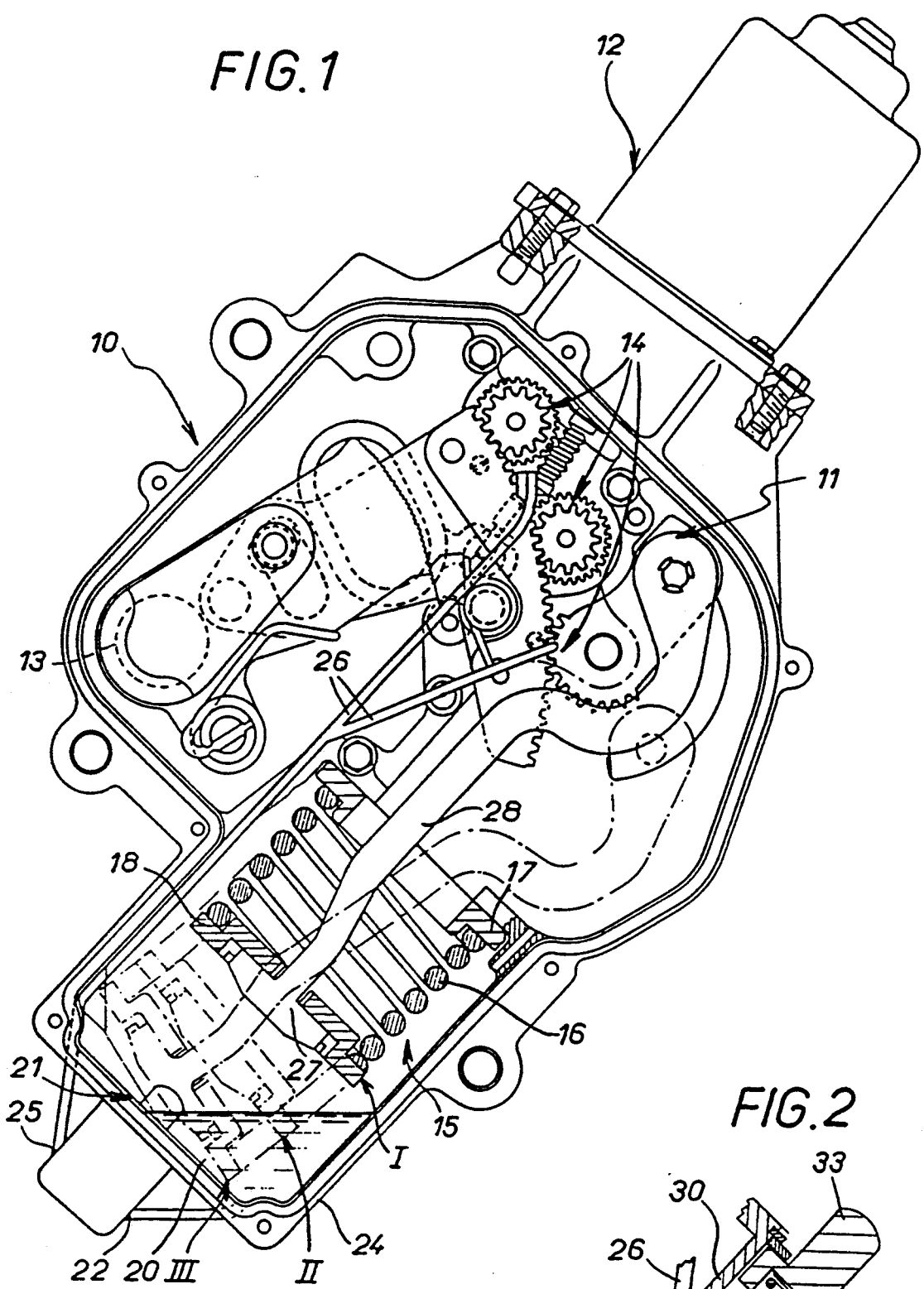
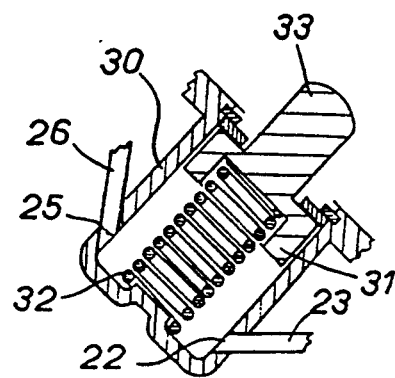

ACTUATOR FOR A SERVO CONTROLLED CLUTCH WITH LUBRICATING MECHANISM

FIELD OF THE INVENTION

The present invention is concerned generally with actuators for servo controlled clutches, in particular for automotive vehicles, such actuators being of the kind comprising a casing, and a mechanism in the casing which, under the control of a motor, is adapted to control an output member which is arranged to control the clutch itself, the actuator comprising in particular a thrust unit which is mounted for generally back and forth movement.

An actuator of this kind is described for example in U.S. Pat. No. 4,828,093 and the corresponding French published patent application FR 2 610 259 A.

DISCUSSION OF THE INVENTION

The purpose of the moveable thrust unit is to provide a facility for automatic lubrication of the mechanism of the actuator, using the displacements of the thrust unit.

An object of the present invention is to provide an actuator of the kind described above, which is characterised, in that the said casing being liquid-tight, a reserve of liquid lubricant is provided in the said casing, and in that it has associated with it pumping means which are arranged to be actuated by the said moveable thrust unit of the mechanism, the suction port of the pump means being in communication with the lower part of the casing while the delivery port is in communication with the said mechanism in at least one region thereof that is to be lubricated.

With this arrangement, at each operation of the pumping means, a controlled quantity of liquid lubricant is injected into the said region or regions of the mechanism. In practice these regions are in particular those in which those components of the mechanism are situated which are most vulnerable to wear, and in particular its gears. The life expectancy of the actuator is thereby improved without calling for any maintenance at all.

The reserve of liquid lubricant can beneficially be kept small, and always returns into the lower part of the casing, which acts as a sump leading directly to the suction port of the pumping means.

Except occasionally for part of the moveable thrust unit, the mechanism of the actuator is thus not submerged in the liquid lubricant, and the invention therefore has the advantage that the mechanism is substantially not braked by the lubricant. In this way an advantageous comprise is reached between lubrication by means of a lubricant liquid and speed of operation of the mechanism, resulting in rapid actuation of the clutch by the mechanism. This is particularly the case where, in accordance with a preferred feature of the invention, the pumping means for lubricating the mechanism are so arranged that they are actuated by the moveable thrust unit of the mechanism only during an overrun of the latter. In other words, the pumping means do not operate at every displacement of the moveable thrust unit, but only from time to time when the latter undergoes a displacement that is greater than normal. Therefore, it is only sometimes that the moveable thrust unit enters the reserve supply of liquid lubricant.

Finally, advantage can be take of the fact that it is possible to provide the pumping means in a relatively crude, and therefore economic, form, its output not being a particularly significant factor.

The features and advantages of the invention will appear more clearly from the description of a preferred embodiment of the invention which follows, and which is given by way of example only and with reference to the accompanying diagrammatic drawings.

BRIEF DESCRIPTION OF THE DRAWINGS

FIG. 1 is a view in cross sectional elevation of an actuator in accordance with the invention.

FIG. 2, which is on a larger scale, is a view in axial cross section of pumping means which, in accordance with the invention, form part of the same actuator.

DESCRIPTION OF PREFERRED EMBODIMENT OF THE INVENTION

FIG. 1 shows an actuator for a servo controlled clutch, more specifically for an automotive vehicle, of the type which is described in U.S. Pat. No. 4,828,093 and the corresponding French published patent application FR 2 610 259A. This actuator is well known per se, and since it does not form a part of the present invention, it will not be described here in all its details. Only those elements of the actuator necessary for an understanding of the present invention will be described.

In this regard it will be sufficient to state that the actuator includes, within a casing 10, a mechanism 11 which is controlled by a motor 12 and which is adapted to control an output member in the form of a shaft 13. The mechanism 11 comprises essentially various gears 14 and a thrust unit 15 which is mounted generally for back and forth movement. The moveable thrust unit 15 is in practice arranged in the lower part of the casing, and comprises a compression spring 16 which acts between a fixed thrust ring 17 and a moveable thrust ring 18. In FIG. 1, the rest or relaxed position of the moveable thrust ring 18 is shown in full lines under the general reference I. Its extreme position during normal operation is indicated in phantom lines under the general reference II.

The action of the thrust unit 15 on the control means for the motor 12 is such that the moveable thrust ring 18 will from time to time be subjected to an overrun. In FIG. 1, under the general reference III, the extreme position of the moveable thrust ring 18 at the end of such an overrun is indicated in phantom lines.

In accordance with the invention, the casing 10 is fluid-tight and contains a reserve of liquid lubricant 20, while pumping means in the form of a pump 21 are associated with it. The pump is adapted to be actuated by the thrust unit 15 of the mechanism 11, and comprise a suction port 22 which communicates, for example via a duct 23, with the lower part 24 of the casing 10 acting as a sump in which the liquid lubricant reserve 20 is collected. Its delivery port 25 communicates, for example through one or more ducts 26, with at least one, and in practice several, regions of the mechanism 11 that are to be lubricated. As is shown by way of example, these regions include those regions of the mechanism 11 which contain the gears 14.

In this example, the pump is arranged in such a way that it is only actuated by the thrust unit 15 during an overrun of the latter. To this end, the pump is arranged as an extension of the thrust unit 15 itself, behind the thrust ring 18 of the latter.

It is thus the moveable thrust ring 18, or a member coupled for movement with it, that is adapted to act on the pump 21. In the present case, an arm 28 has a head 27, by which it engages the moveable thrust ring 18, the arm 28 being part of the mechanism 11 and cooperating with the ring 18 by abutting engagement with the latter.

In this example, the pump 21 is of the kind having a cylinder 30 and a piston 31, with the cylinder 30 being a local extension of the casing 10. The piston 31, which acts against a return spring 32, carries a nose 33 which projects into the casing 10, and the thrust unit 15 is arranged to act during its overrun on the nose 33, through the head 27. It is not necessary to provide any valve or sealing joint.

The suction port 22 and delivery port 25 of the pump 21 may consist of no more than holes in the cylinder 30, into which the corresponding ducts 23 and 26 are fitted.

In this example, the motor 12 is an electric motor which is secured to the casing 10 which has an output shaft formed with two opposed lead screw portions. The mechanism 11 includes a toothed sector together with double pinions, each of the latter being in the form of two toothed wheels meshing respectively with the toothed sector and with one of the lead screw portions of the output shaft of the motor 12. The spring 16 is a compensating spring, connected through the cranked arm 28, which is in the form of a double arm, to a pinion which meshes with the toothed sector. The shaft 13 is arranged to actuate a fork and a declutching member, in the manner disclosed in U.S. Pat. No. 4,650,056 and the corresponding French published patent application FR 2 564 999A.

The motor 12 can of course be of the hydraulic type or of any other suitable type, and the output shaft of the motor may include only a single pinion in the manner described in the same United and States and French patent documents.

What is claimed is:

1. An actuator for a servo controlled clutch, comprising: a casing; a motor carried by the casing; and output member carried by the casing for actuating the clutch; a mechanism in the casing, coupling the motor with the output member for controlling the latter under the control of the former, the casing being liquid-tight for containing a reserve of liquid lubricant and including a lower portion; pumping means carried by the casing adjacent to said lower portion of the casing, the pumping means having a suction port and at least one delivery port; means connecting the suction port into the casing; and further means connecting the or each delivery port with said mechanism in at least one region thereof, said mechanism including a moveable thrust unit and the actuator further including means mounting the thrust unit in the casing for reciprocating movement into and out of engagement with the pumping means, whereby to actuate the latter to convey lubricant from said reserve thereof to said region or regions of the mechanism.

2. An actuator according to claim 1 wherein the mechanism comprises means enabling the thrust unit to reciprocate between a first and a second position, and between the first position and an overrun position beyond the second position, the pumping means being so located as to be engaged by the thrust unit only when the latter is in its overrun position.

3. An actuator according to claim 1, wherein the thrust unit comprises a fixed thrust ring, a moveable thrust ring, and a compression spring between the said thrust rings, the moveable thrust ring being so located as to act on the associated pumping means.

4. An actuator according to claim 1, wherein the pumping means are arranged as an extension of the moveable thrust unit.

5. An actuator according to claim 4, in which the pumping means comprises a cylinder and a piston moveable in the cylinder, with the piston carrying a nose projecting therefrom for engagement by the thrust unit on said nose.

6. An actuator according to claim 3, in which said mechanism includes a generally reciprocable arm having a head engaging the moveable thrust ring so as to be moveable therewith, the head being so positioned as to engage the pumping means for actuation of the latter.

7. An actuator according to claim 1 further comprising a duct connecting the suction port with the said lower portion of the casing, and at least one further duct connecting the delivery port with the said mechanism in at least one said region thereof.

8. An actuator for a servo controlled clutch, comprising: a casing; a motor carried by the casing; an output member carried by the casing for actuating the clutch; a mechanism in the casing, coupling the motor with the output member for controlling the latter under the control of the former, the casing being liquid-tight for containing a reserve of liquid lubricant and including a lower portion; pumping means carried by the casing adjacent to said lower portion of the casing, the pumping means having a suction port and at least one delivery port; means connecting the suction port into the casing; and further means connecting the or each delivery port with said mechanism in at least one region thereof, said mechanism including a moveable thrust unit and the actuator further including means mounting the thrust unit in the casing for reciprocating movement into and out of engagement with the pumping means, whereby to actuate the latter to convey lubricant from said reserve thereof to said region or regions of the mechanism, and whereby the mechanism comprises means enabling the thrust unit to reciprocate between a first and a second position, and between the first position and an overrun position beyond the second position, the pumping means being so located as to be engaged by the thrust unit only when the latter is in its overrun position.

* * * * *